J. H. R. Reffelt,
Arithmetical Aid,
Nº 37,825. Patented Mar. 3, 1863.
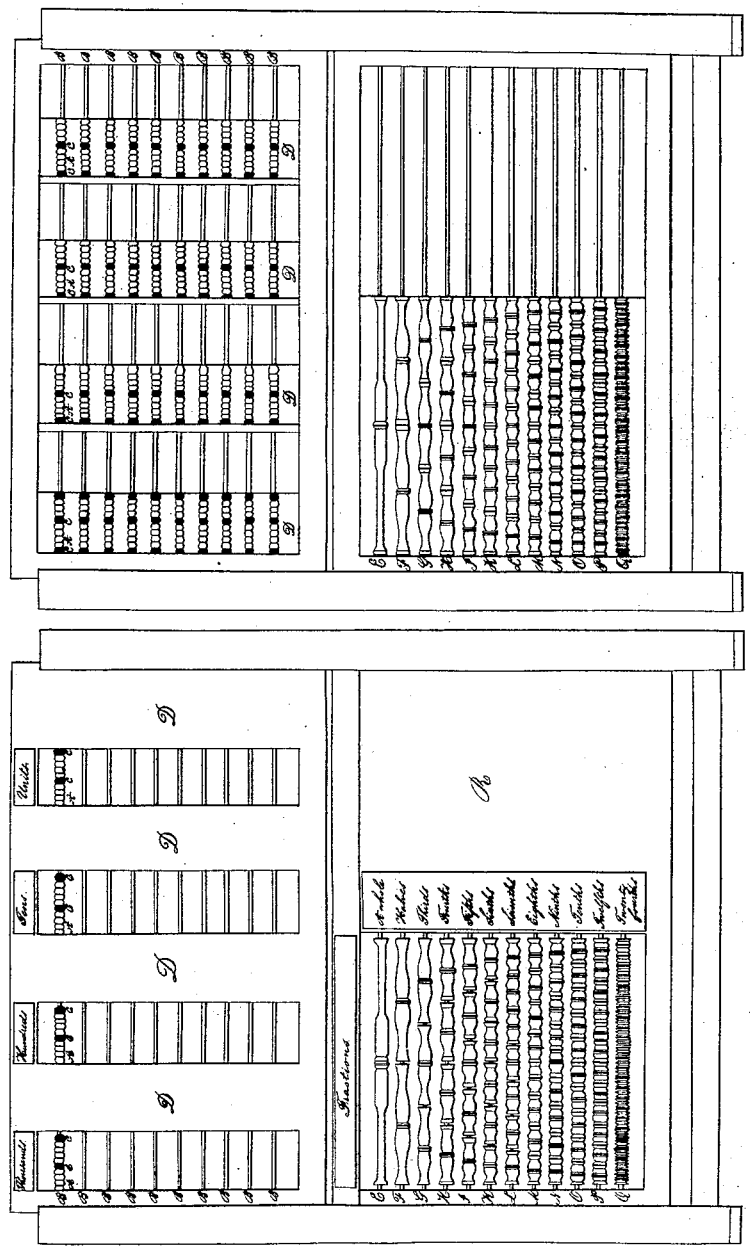
Witnesses:
Inventor:
John Hamann Rudolph Reffelt

UNITED STATES PATENT OFFICE.

JOHN HERMANN RUDOLPH REFFELT, OF HOBOKEN, NEW JERSEY.

IMPROVEMENT IN NUMERAL FRAMES.

Specification forming part of Letters Patent No. 37,825, dated March 3, 1863.

*To all whom it may concern:*

Be it known that I, JOHN HERMANN RUDOLPH REFFELT, of Hoboken, in the county of Hudson, in the State of New Jersey, have invented a new and improved apparatus for teaching notation and the relation that numbers bear to one another, and for doing various arithmetical processes; and I do hereby declare that the following is a full and exact description thereof, reference being had to the accompanying drawings, and to the letters of reference marked thereon, which said drawings are hereby made a part of this specification, and in which—

Figure 1 is a front view, and Fig. 2 a back view, of the apparatus aforesaid.

Said apparatus consists of an upright wooden frame of a size to be varied according to the use for which the same is intended, being larger if intended for a school, and smaller in proportion if intended for private use. The frame is divided into two—that is to say, an upper and a lower section—but both hung in a sash slide, so that either one of them may be either elevated or let down at pleasure.

A and C in the drawings are balls of wood or other material strung and moving upon wires, and divided into four sections or compartments, representing units, tens, hundreds, and thousands, respectively, there being ten strings or wires in each compartment, and ten balls upon each string beside for the more ready computation. Every fifth ball in each string C is distinguished by a color differing from those on each side of it.

D are panels or shields of opaque material, behind which the balls remain hid when not in use. These panels in large apparatus may be made of smooth wood and painted, so as to be available for blackboards.

Taking the other or lower section in the drawings, (which, however, may be by means of the sash-slide before referred to shoved up so as to form the upper section, if desirable,) E is a cylinder, made of ivory, wood, or other material, having a high-colored rim, and sliding likewise upon a wire, and intended to represent one whole. F is two cylinders, each half as long as the last, and likewise furnished with high-colored rims for the more ready detection of the dividing-line, and each representing one-half. G is three cylinders, similarly marked, each representing one-third.

H, I, K, L, M, N, O, P, and Q are cylinders so relatively divided as to represent fourths, fifths, sixths, sevenths, ninths, tenths, twelfths, and twenty-fourths, respectively. R is a larger panel or shield covering these fraction-cylinders when not in use, and likewise in large apparatus finished off for a blackboard.

The name that I propose to give to this apparatus is, "Reffelt's Arithmetical Aid."

To enable others to make use of my invention, I will now proceed to describe its operation.

For the purpose of teaching numeration and the relation that numbers bear to one another, I would proceed as follows: The balls being all shoved out of sight, I would bring out 1, 2, 3, 6, 8 balls, &c., among the units to denote the corresponding numbers. I would then bring out ten unit-balls, and explain that these ten are equal to one ten-ball. Bringing out, say, fourteen unit-balls, I would count off and shove back ten of these, and in their stead bring out one ten-ball, and thus illustrate that one ten-ball and four unit-balls are equal to fourteen unit-balls, and so on in all its various ramifications up to one hundred, &c. Then I would go through the same process with the ten-balls and hundred-balls, and finally with hundred-balls and thousand-balls. I would then proceed to compound numbers on the apparatus, thus: Say, for the number 1782, I would bring out one thousand-ball and write the figure 1 on the panel adjoining; seven hundred-balls, and write the figure 7 on the panel adjoining; eight ten-balls, and write the figure 8 on the panel adjoining, and two unit-balls, and write the figure 2 on the panel adjoining, &c.

For doing arithmetical processes I would proceed thus, say addition: If I desire to add 1782 and 1629 together, I would, say, on the second series of wires bring out the first of these numbers, as above stated, and under it, say on the third wires, by bringing out one thousand, six hundred, two tens, and nine unit balls, produce the second. Then, counting off ten of my unit-balls, I would shove these back, and in their stead bring out another ten-ball. Finding that I had now less than ten unit-balls left, I proceed to count off ten of the ten-balls and shove these back, bringing out one hundred-ball in their stead. Then I count off ten of the hundred-balls, and, shoving back these, bring out one thousand-ball in their stead, when I would find that I have three thousand-balls, four hundred-balls, one ten-ball, and one unit-ball left, making 3411. Subtraction would be done on the same principle. Multiplication could only be done on an apparatus of the extent represented in the drawings, in cases where the multiplicator does not exceed the number 10 nor the multiplicand the number 10000. Suppose, then, I am to multiply the number 1234 by 8, I bring out one thousand-ball, two hundred-balls, three ten-balls, and four unit-balls, and this I repeat seven times more upon the other strings, and thus I have the multiplicand eight times. On then counting the units I find that I have three times ten, which I shove back and bring out three ten-balls in their stead, leaving two unit-balls over. Finding twice ten-balls, I shove these back, with seven ten-balls remaining, and bring out two hundred-balls. I then find once ten balls among the hundreds, which I shove back, bringing out one thousand ball, and leaving eight hundred-balls; and, finally, I find that I have nine thousand, eight hundred, seven ten, and two unit balls remaining, or 9872, as my product.

For division, if, for example, I am to divide 9872 by 4, I, after bringing out the requisite number of balls in each section, begin with the thousand-balls by dividing them equally over four strings, and, finding that I have one over, I slide it back and bring out ten hundred-balls in its stead. I then proceed in the same way with the hundreds, tens, and units, and thus receive 2468 as my quotient. On a similar principle, I use the fraction cylinder or pieces to denote fractions and illustrate their relations to one another, and also for making calculations in mixed numbers; and by varying the manner of using the apparatus and calling the respective sections pounds, shillings, pence, and farthings, or any other desired denominations, I may likewise use it for the illustration of and calculations in denominate numbers. I can also make use of it in various other arithmetical processes, as equations, calculations of surfaces, &c.

What I claim as my invention, and desire to secure by Letters Patent, is—

The division of the balls used into sections or compartments denoting units, tens, hundreds, and thousands, or any denominations desired, and the use of sliding pieces of various proportionate lengths to denote fractions.

JOHN HERMANN RUDOLPH REFFELT.

Witnesses:
   J. HARVEY LYONS,
   ADAM CRANSTOUN.